United States Patent [19]
Curtis et al.

[11] Patent Number: 5,719,691
[45] Date of Patent: *Feb. 17, 1998

[54] PHASE CORRELATION MULTIPLEX HOLOGRAPHY

[75] Inventors: Kevin Curtis, Chatham; William Larry Wilson, Somerville, both of N.J.

[73] Assignee: Lucent Technologies Inc., Murray Hill, N.J.

[*] Notice: The portion of the term of this patent subsequent to May 5, 1995, has been disclaimed.

[21] Appl. No.: 435,705

[22] Filed: May 5, 1995

[51] Int. Cl.⁶ .............................. G03H 1/12; G03H 1/26; G11C 13/04; G11B 7/00
[52] U.S. Cl. .............................. 359/11; 359/22; 359/24; 369/103; 365/125
[58] Field of Search .............................. 359/10, 11, 24, 359/22, 25, 29; 365/125; 369/103

[56] References Cited

U.S. PATENT DOCUMENTS 3,612,641  10/1971  Eaglesfield .............................. 359/11

FOREIGN PATENT DOCUMENTS 2527800  12/1983  France .............................. 359/24

OTHER PUBLICATIONS

V. N. Morozov, "Theory or holograms formed using a coded reference beam", Sov. J. Quantum Elect. 7(8), Aug. 1977, pp. 961–964.

Primary Examiner—Jon W. Henry

[57] ABSTRACT

Holograms within an array are recorded and/or read out by use of a reference/read out beam produced by illumination of a phase mask.

33 Claims, 2 Drawing Sheets

PHASE CORRELATION MULTIPLEX HOLOGRAPHY

TECHNICAL FIELD

Holography.

DESCRIPTION OF RELATED ART

Holography, by which images are reconstructed from patterns produced by interference between a signal and reference beam has, from its inception in 1948, provoked interest in artistic circles. Its very large storage capacity soon led to contemplated use for digital storage. Both were given impetus by the introduction of the laser, which would serve as a stable, high-intensity, monochromatic light source.

Desire to take advantage of high density storage soon led to multiplexing. An early process, "spatial multiplexing", simply records successive images in independent regions of the recording medium. Packing density is limited by the need to keep holograms separated.

A number of processes record successive holograms in the same region of the medium. In "angle multiplexing", differentiation depends on angle of incidence of the readout beam. In "wavelength multiplexing", coincident or overlapping images are independently accessed by changing wavelength. A method described in *APPLIED OPTICS* vol 7, no. 1, p. 91 (1968), bases multiplexing and readout of sequential holograms on phase information imposed on the reference and readout beams by successive ground glass masks.

Selectivity in angle multiplexing, wavelength multiplexing, and phase multiplexing, all dependent on Bragg selectivity, is enhanced with "Volume holography", using a thick recording medium: A. P. Yakimovich, in *Opt Spectrosc.* (USSR) vol. 47, no. 5, November 1979, at pp. 530–535, describes use of a spherical reference beam, in lieu of the usual plane wave.

Differentiation between successive overlapping holograms at different positions on a shifted medium depends on Bragg selectivity. The method, "shift holography", has been described by A. Pu, et al. See, 1995 *OSA Conference on Optical Computing, OSA Technical Digest Series*, vol. 10, pp. 219–221. It provides for high density packing of successive holograms in an x-y array. Overlapping holograms produced by shifting the medium in the "x-direction" —in the grating direction—are differentiated by first-order Bragg selectivity. By slanting the plane of the grating so that it is oblique to the medium, second order Bragg selectivity permits selection of holograms overlapping in the y-direction. Reported densities are excellent, but required a thick (8 mm) recording medium.

Advances in the recording medium have not kept pace. Results reported by Pu, et al. used a flee-standing crystal. Cost and manufacture expedience would profit by substitution of a deposited layer. To date, acceptable layered media have had a maximum thickness of only one hundred or a few hundred μm. It will be some time before layered media of the desired 8 mm thickness are available.

SUMMARY OF THE INVENTION

In "phase-correlation multiplex holography", phase selectivity replaces Bragg selectivity as the means for differentiating overlapping images. Differentiation depends on identity of phase and attendant characteristics for the readout and reference beams. In the preferred embodiment, a single random phase mask in the path of the reference beam introduces the phase content that is used for selection of individual holograms of an overlapping series.

Unlike Bragg selectivity, phase selectivity does not depend on grating direction, so that selectivity is identical in x- and y-directions.

Perhaps most significant, phase selectivity does not require a thick medium. Packing densities comparable to those of shift holography, have been obtained for thicknesses well below 8 mm—even in layers of the order of microns in thickness. Phase-correlation multiplexing is unique in that, unlike reported methods, selectivity is independent of both medium thickness and information content.

TERMINOLOGY

Figure 1:
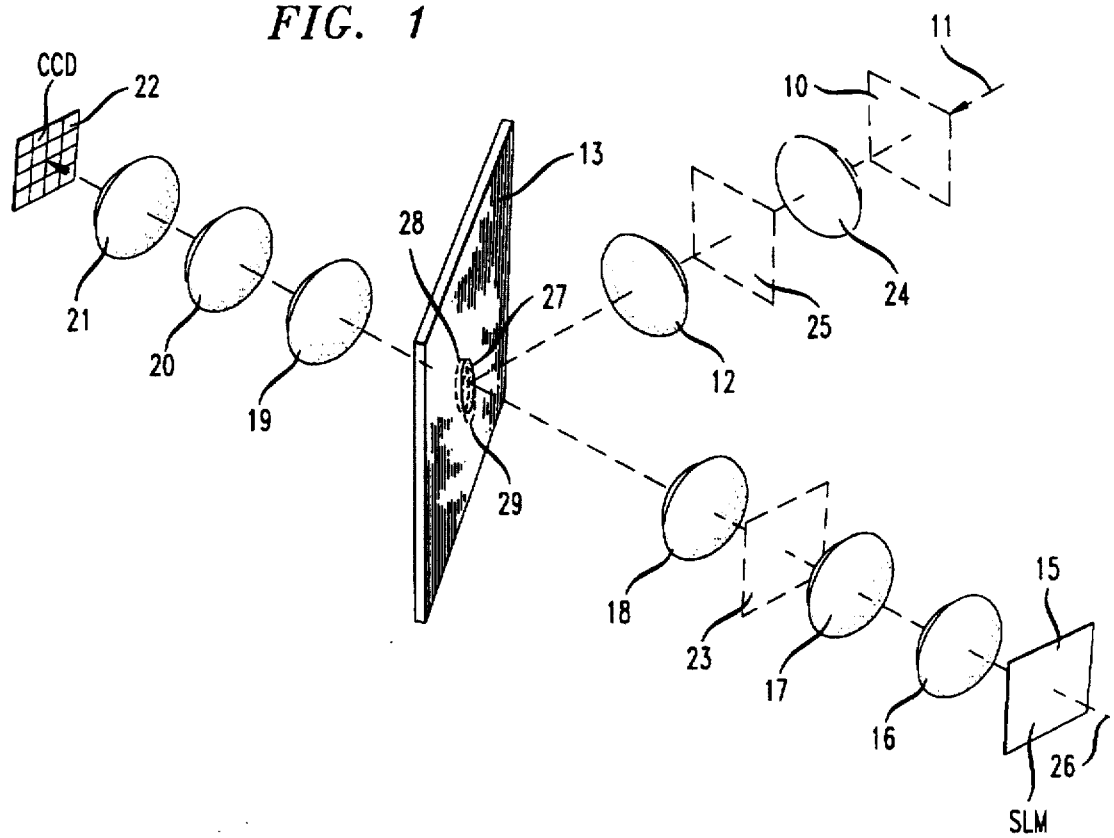
FIG. 1 is a schematic representation of the apparatus used in the Examples.

Disclosure is facilitated by use of a terminology convention. Certain terms are adopted from shift holography (in which first order Bragg selectivity is required for differentiating overlapping holograms in the shift direction). While useful for description and comparison, these terms do not imply the limitations of the earlier process. As a prime example, since Bragg selectivity is not used, there is no relationship between direction and packing density.

X-Direction—The direction of relative motion between the recording medium and the beams.

Y-Direction—The major direction orthogonal to the x-direction in the recording medium.

Correlation Function—The similarity function indicating traversal distance necessary for meaningful change in the amount of overlap of the concerned function. See, *Sov. J. Quant. Electron.*, vol. 7, no. 8, pp. 961–964, August 1977, describing the function as applied to a phase mask.

Correlation function represents the similarity of a function to the shifted complex conjugate of a second function. If the functions are identical, the correlation is called an auto-correlation function. The value of the auto-correlation at position (0,0), perfectly overlapped, is a maximum. The value at this position is equal to the total energy of the function. As the functions are shifted with respect to each other, the value of the function at this position will be smaller because of the resulting decrease in overlap. For a random phase mask, the auto-correlation function is sharply-peaked—the width of the peak is on the order of the size of a pixel. Most effective operation results by use of a common form of commercially-available random mask in which the average delay for the entire mask is numerically equal to zero. This corresponds with a binary phase mask in which 50% of the cross section is of each of the two binary values, which are symmetric about zero. The same condition is attained for a mask of random rather than binary values, providing the array of pixels is "white" —a condition realized for truly random, multi-wavelength, scratch depth. In terms of the function, the height-to-floor ratio of the peak is large—shifting the mask by a pixel width results in an effective area of overlap which approaches zero for such a mask.

Phase Beam—Characterizing the reference beam as incident on the holographic medium, constituting a beam containing many rays of varying angles of incidence and of non-uniform phase content to result in an auto-correlation function adequate for needed selectivity. The term is intended to include beams of deterministic ray and phase content.

Phase-Ordered Beam—Differentiated from a phase beam, a beam primarily consisting of a single ray or of rays of continuously varying angle, e.g., a plane wave, or a converging or diverging beam. Its auto-correlation function is substantially equal to its cross-sectional area. A phase-ordered beam is not suitable for the invention.

Phase Mask—Mask which, as illuminated by a phase-ordered beam, yields a phase beam. The term includes conventional phase masks and/or scatter masks containing a prescribed ordered array of random or deterministic pixels of constant or varying phase delay. The term includes ground glass which is exemplary of masks containing a random array, which while functional, may hinder some contemplated uses.

Holographic Medium (or "Medium")—The actinic material within which the hologram is recorded. It may take a variety of forms, such as, e.g., a film containing dispersed silver halide particles, an acrylate-based photopolymer, or a free-standing $LiNbO_3$ crystal.

Random—Non-prescribed order, defining a sequence which does not repeat over a substantial fraction of the field. The term is descriptive of pixels within a phase mask or of rays within a beam.

Thin Medium—Recording medium of less than 1 mm—as distinguished from "thick media" >1 mm. (The designation is a formal one based primarily on available product. It does not have the significance of media used for multiplexing based on Bragg selection.)

Overlapping—Refers to multiple holograms with regions occupying the same volume of recording medium. As ordinarily contemplated, in phase-correlation multiplexing, successive holograms are displaced by the shift distance so that they do not, in their entirety, occupy the same volume.

DETAILED DESCRIPTION

General—Phase correlation holography functions as a truly two-dimensional (2D) holographic multiplexing process. Preferred embodiments use a medium which is sufficiently thin to preclude Bragg selectivity for differentiation of successive holograms. It has many valuable attributes, and will likely become the long-sought practical digital recording process.

Selection is now entirely based on the content of the reference beam—on inclusion of rays of differing angle of incidence and non-uniform phase. Adequacy is measurable in terms of the auto-correlation function of the phase mask or of the corresponding function for the beam. A first consequence is to make selection independent of direction in the plane of the medium—selectivity in y- and x-directions, or in intermediate directions, can be made identical in the absence of limitations imposed by the medium or by processing conditions.

Promising results in conventional shift holography have depended on use of thick media—thicknesses of 8 mm and greater. Widespread use requires development of a thick organic photopolymer layer to replace the expensive, free-standing lithium niobate crystal. That impediment is now avoided. Examples 2 and 3 use a commercially-available holographic film with a medium thickness of 7 μm. The film medium consists of a dispersion of silver halide particles in a gelatin matrix. Commercial implementation of phase correlation holography is expected to use media thickness of <1 mm.

2D multiplexing with thin media relaxes processing constraints. Angles of incidence for signal and reference beams—"half-angles" (for each of the beams and a line orthogonal to the medium)—need not be equal. In Example 3, the reference beam was, itself, orthogonal to the recording medium with some improvement in signal-to-noise ratio.

A general consequence of phase correlation holography is design flexibility. Many considerations, once critical, become unimportant. In initial experiments, significantly improved results with thicker media, were obtained for arrangements in which the phase mask was imaged on the medium. Minimization of zero order diffraction ray has, for earlier processes, required spatial filtering in the Fourier plane of the reference lens. Neither is important for thin media, although some noise reduction may result by filtering.

The System—General discussion is aided by reference to FIG. 1. Elements shown in phantom indicate alternatives and enable discussion of system variations. Both versions of FIG. 1 use an illuminating beam 11, which is converted into a phase beam by a phase mask. In the instance of Examples 2 and 3, use of the single lens 12, with the mask positioned on plane 25, produced a hologram 27 which is the Fourier transform of the mask on the medium. The phase mask used was a random binary phase mask and had a pixel pitch of 20 μm, was of approximate overall dimensions, 2 cm×2 cm (1024×1024 pixels). Half of the randomly located pixels imposed a phase-shift of 180°, so that changing phase across the beam front averaged at zero. The signal beam 26 is modulated by "spatial light modulator" 15 producing a signal pattern from a computer not shown. Medium 13 was a 4 mm thick layer of $LiNbO_3$ in Examples 1 and 5 and was replaced by thin media in other numbered examples.

The experimental arrangement shown provides for signal introduction through lenses 16, 17 and 18, and for readout by means of lenses 19, 20 and 21. With lenses in standard 4F configuration, a Fourier transform hologram 27 is recorded on medium 13, and is reconstructed to produce an image on detector 22. 4F configuration requires focal distance spacings so that object-to-lens 16 spacing is equal to the focal distance of lens 16, $F_{16}$, lens 21-to-detector spacing is equal to the focal distance $F_{21}$, and lens to lens spacings are the sum of focal distances, i.e., $F_{16}+F_{17}$ for the distance between lenses 16 and 17.

The specifics of the arrangement are only illustrative. 4F optics are not required—relay optics are acceptable. Spatial filtering may be done between lenses, in the lens series 19–21, to improve SNR. The phase mask need not be located at either the focal plane nor the focus of lens 12, nor is it required that medium 13 be located at the other focal plane. Lens 24, shown in phantom, illustrates an alternative arrangement providing for imaging the mask, now located at plane 10, onto the medium. It is not required that beam 11 be a plane wave—e.g., a spherical beam has been substituted. Selectivity is not very sensitive to the exact position of the phase mask, but it is required that the position be the same during reconstruction. Omission of lenses in the reference beam results in some loss in selectivity which may be tolerable.

The apparatus shown is otherwise illustrative only. Arrangement for Fourier transform holography storage is only one option. For example, with successive elements still located on Fourier planes, omission of one lens in each of the 16–18 and 19–21 lens series results in an image hologram and continues to provide for image reconstruction. A phase mask in contact with SLM 15 or at plane image plane 23 assures uniform brightness of the signal beam for better recording. In addition, the signal beam may be filtered to eliminate higher-order diffraction modes or miscellaneous noise.

For thick media—for media >1 mm—best results have been obtained for imaging of the phase mask on the recording medium. For thick media, it has been found useful to filter out zeroth order diffracted waves by use of a blocking filter on Fourier plane 25 in the reference beam. Such a DC filter, consisting of a central blocking region, may in addition have horizontal and vertical lines crossing at this region, so as to additionally block x- and y-components.

For thin media, the Fourier plane filter may not be necessary. With the 7 μm thick medium of Example 2, noise was small without it. While a Fourier transform of the phase mask was as effective as a mask image, use of a spatial filter with a transform, rather than an image, may result in some increase in SNR. Filtering is desirably on the plane of the phase mask.

Figure 3:
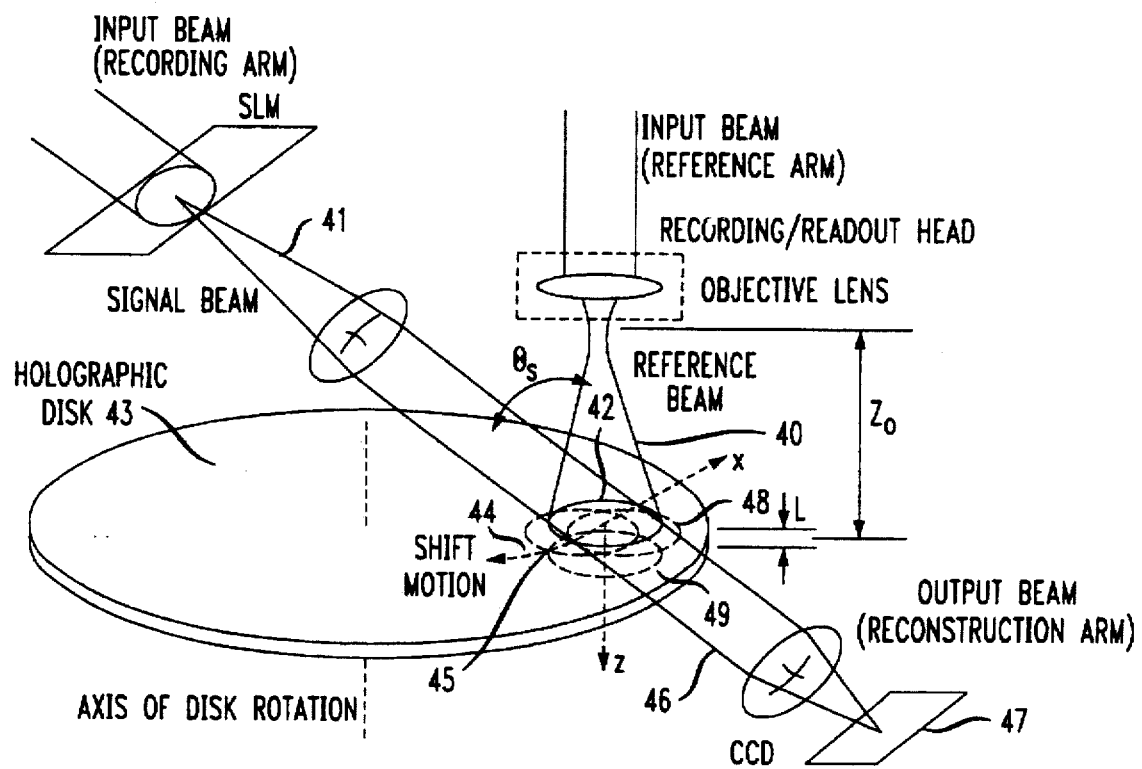
FIG. 3, labeled "Prior Art", shows is a copy of a figure from A.Pu et al, cited above, showing "shift holography", but with two additional holograms in phantom, and with reference numerals.

Prior art FIG. 3, taken from A.Pu et at, cited in "Description of Related Art", shows a relevant system. This figure shows apparatus and process as including a fixed position reference beam 40, which interferes with a signal beam 41, to produce hologram 42, on disk-shaped recording medium 43. Shifting is accomplished by rotating the disk, to result in a shift motion 44 of a few microns, allowing a new partially overlapping hologram 45 to be recorded in the shifted position. In reconstruction, use is made of a readout beam identical to the reference beam used in recording, to produce a reconstructed beam 46, resulting in an image on detector 47.

Phase Beam—In the generally discussed embodiment, the phase mask is illuminated by a phase-ordered beam such as a plane wave, and only thereafter is a reference beam with proper phase and angle content produced. More generally, the requirement for the reference beam is that it contain the proper phase information when interfering with the signal beam—produced either at inception, or by modulation of a phase mask, or by a combination of the two.

The phase mask may be dispensed with altogether. Phase locked diode arrays have been proposed for use in holographic neural networks. See *Optoelectronics*, vol. 8, no. 1, pp. 21–34 March 1993. The same form of circuitry may be used to form a phase-mismatched diode array on an integrated circuit, and serve to generate the beam. Other forms of multiple point-source arrays are visualized. A series of properly directed lenslets *Optoelectronic*, vol. 8, no. 1, pp. 111–123 (March 1993), or reflecting surfaces may introduce phase content in lieu of (or as a form of) phase mask.

Phase Mask—The nature of the phase mask is well known to the artisan. The term includes both ground glass with its very large number of small dissimilar pixels, and binary phase masks with a smaller number of nominally identical pixels, as well as intermediate phase mask structures. In all events, traversal time for radiation varies across the exit surface of the mask, to produce the changing phase delay which is the essence of the mask. For a very high level of perfection, a binary phase mask containing 20 pixels, each 1/20th of the mask area is sufficient for the invention. Expected imperfections are accommodated by a 10 pixel×10 pixel mask, and such a mask is regarded as a minimum requirement for the invention.

For the nominal phase mask in which 50% of the surface is altered from planarity, etch pits introducing a phase change of, at least 15° is operative, although a phase change of at least 45° is preferred. For minimizing noise, the average phase variation for the entire mask should be close to zero, in turn requiring a phase change of 180° in the instance of the binary phase mask. This is achieved in a conventional binary mask in which etch pits occupy 50% of the mask surface. The requirement is statistically satisfied in the most complex phase mask—in ground glass—in which widely varying pixels, most varying one from another by many wavelengths, occupy the entire surface.

The functioning characteristic of the phase mask is defined in terms of its auto-correlation function. In inexact terms, this is a measure of the position-to-position self-similarity of the mask. The requirement, that the mask have the desired selectivity, may be measured in terms of the auto-correlation peak width—with the peak width approximately equal to the needed selectivity. This assumed correspondence is descriptive of high-quality, commercially-available phase masks. (Accordingly, one suitable commercial phase mask is a random phase mask specified by: a) wavelength; b) number of pixels; and c) pixel pitch.)

Experimentally, sufficient phase content has been introduced into a plane wave beam with a random mask constituted of pixels of a pitch (size) of 10–20 μm, with at least 100 pixels in each of the x- and y-directions in the mask. In theory not required, maximal varied pixel delay times approaching 180° lessen effects of compositional and physical non-uniformities, and relax manufacturing specifications. In Example 1, a packing density of 340 bits/μm$^2$ was obtained using a phase mask containing ~$10^6$ pixels 20 μm in size. A number of practical considerations at this time set a limit on shift distance. Factors, such as the dynamic range of the medium and mechanical limitations on the shifting mechanism, are believed responsible for an experimentally determined density of about 5 μm/hologram in both x and y. Such selectivity is attainable with a pixel size of about 10 μm.

Alternative to the usual commercial random binary phase mask in which identical etch pits are randomly positioned, differing pixel-associated delay times may be associated with an ordered pixel array. Various techniques offered randomness both in position and in individual pixel characteristics (such as in ordinary ground glass). An averaged mask delay time of zero statistically assures cancellation of overlapping hologram regions and lessens noise. In other mask structures, differing delay times are due to refractive index variations.

There may be economic or other circumstances in which it is desirable to use an ordered phase mask to yield a deliberately repeating sequence over a relatively small fraction of the field. This consideration may outweigh the usual objective of absolute independence of multiplexed holograms, so that some additional noise may be tolerated. In the same fashion, a deterministic phase mask—a mask with prescribed pixel-to-pixel order, may be used e.g., to maximize diffraction efficiency of the hologram or optical throughput of the system.

Foreseen uses require replication of phase masks. A variety of procedures may be suitable. Individual masks may be produced from a master mask with techniques used in fabrication of semiconductor integrated circuits. Surface-modified masks may be replicated by stamping; embossing, or casting. These procedures are now used for replication of gratings or other diffractive optics. A procedure used in the "writing" of glass fiber gratings, may be used in lieu of material removal—the procedure depends on illuminationinduced index change. See *Applied Phys. Lett.*, vol. 63, no. 13, pp. 1727–1729 (Sept. 1993).

Scatter masks containing dispersed reflecting particles within a transparent sheet, may be used. Consistent with theory, use of particles of uniform size requires random positioning—in the thickness direction as well as in plane—for needed angle and phase content.

Phase masks may operate in transmission or reflection.

Recording Medium

Good results have been obtained with commodity-grade holographic film, similar to black and white photographic film, and consisting of dispersed silver halide particles in a supported gelatin layer. Processing includes development and fixing, followed by bleaching, to leave an image of varying refractive index. Alternatives include homogeneous dichromated gelatin films. See *Optical Holography*, Academic Press, Inc. San Diego, Calif., chap. 10, pp. 265–310 (1971).

There appears to be little reason for, and some disadvantage to, thick media. They are, however, not precluded, and may yield results comparable to those for shift holography multiplexing. Using a thick medium, phase selection may be used in the y-direction, while depending on Bragg selection in x. Lithium niobate and acrylate-based photopolymers have been used as thick media.

Recorded Array

The recorded medium will likely become an article of commerce. It may be disk-shaped, and resemble a CD-ROM. It may be of other planar shapes, e.g. rectangular. It may be non-planar. It will generally include a layer of recorded medium supported by a substrate. Particularly for thin layers, it may be supported on a flexible substrate and be spooled when not in use.

Regardless of physical form, stored information includes signal information, together with selection information, the latter in accordance with the inventive teaching. Selection information is in the form of refractive index variations defining a phase beam. It is possible to extract the selection information by irradiating the hologram with the corresponding signal beam. For usual practice, the phase beam, so defined, corresponds with the pattern of the phase mask responsible for producing the reference beam.

Apparatus

General design has been considered in the description of FIG. 1. It includes means for bringing about the required relative motion between the medium and the beam(s), together with means for generating the required phase beam. Requirements for recording and readout apparatus are the same. FIG. 1 includes apparatus for readout and is illustrative of readout apparatus (which is not provided with elements for introducing the signal). As in writing, the required relative motion may be by movement of the medium, 13 by the beam 11 or by both.

Experimental

Experimental apparatus was chosen to permit variation in parameters which will be fixed in practice. For example, a simple prism beam splitter was replaced by a relatively complex apparatus to allow changing relative brightness of the signal and reference beams. It consisted of it polarization beam splitter and a half-wave plate. The spatial light modulator, used experimentally, permitted variation in bit page density, as well as changing content.

Example 1—The apparatus was that shown in FIG. 1, using a spatial light modulator, displaying 640×480 pixels, as element 15. The phase mask, at plane 10, was a 2 cm×2 cm glass plate, containing 1024×1024, 20 μm pixels. Phase-varying pixels were etch pits of ~π phase depth for the recording wavelength of λ=532 nm. Both sides of the mask were antireflection coated. With lenses 12 and 24 in 4F configuration, i.e., with a single phase mask at plane 10 and using a DC filter at plane 25, a filtered image of the phase mask was produced in the medium. The beams illuminating the phase mask and the spatial light modulator were produced from one doubled $Nd^{3+}$:YAG source.

The method was used to store 921 holograms in a 4 mm thick $LiNbO_3$ crystal, with holograms shifted equally at 30 μm, in both the x (holograms 27–28) and y (holograms 27–29) directions. Shifting was accomplished by moving the medium 13 relative to fixed beams 11 and 26.

Examples 2–4—A variety of experiments used "thin media" —of varying thicknesses, all less than 1 mm. For comparison purposes, Examples 3 and 4 use commercially available holographic films of the same general manufacturer-specifications with steps taken to minimize shrinkage. A number of parameters were varied without affecting end results. The angles of incidence of the reference beam and signal beam had no significant effect on selectivity. In example 3, θR, the angle of incidence of the reference beam, was zero—i.e., the reference beam was orthogonal to the medium. The phase mask was imaged on the medium in each of Examples 2–4. In addition, Examples 3 and 4 were repeated, however, without lens 24 and with the mask positioned at plane 25, in order to produce a Fourier transform rather than an image in the medium. Selectivity was unaffected by substitution of the transform. In all instances, SNR was significantly better for thin media.

The medium used in Example 2 is a member of a class described and claimed in co-pending U.S. App. Ser. No. 08/698,143, filed Aug. 15, 1996. Briefly, it is an all-acrylate composition constituted of an oligomeric matrix and dispersed monomer, which together, under the influence of a photoinitiator, respond to illumination by local polymerization to increase refractive index. The specific composition is:

| Wt. % | Components |
| --- | --- |
| 37.23 | isobornyl acrylate |
| 55.84 | oligomeric urethane acrylate |
| 5.96 | photoinitiator |
| 0.97 | tertiary butyl hydroperoxide |

Equipment was of the form described in FIG. 1. Unspecified conditions were the same as for Example 1.

| Example | Thickness | $\theta_R$ | $\theta_S$ |
| --- | --- | --- | --- |
| 2-Photopolymer | 100 μm | 35° | 35° |
| 3-Holographic film | 7 μm | 0° | 30° |
| 4-Holographic film | 7 μm | 35° | 35° |

Example 5—Example 4 was repeated, substituting a 4 mm thick $LiNbO_3$ slab for the holographic film. Use of the orthogonal reference beam decreased SNR, relative both to Examples 4 and 1. The effect was monitored by comparing the peak diffraction energy of the signal to a specified persistent noise component.

In all instances, the signal was produced by illumination of a spatial light modulator of 640 by 480 pixels. In every instance, shift and row-to-row spacing was 30 µm, to result in a packing density of >300 bits/µm².

Figure 2:
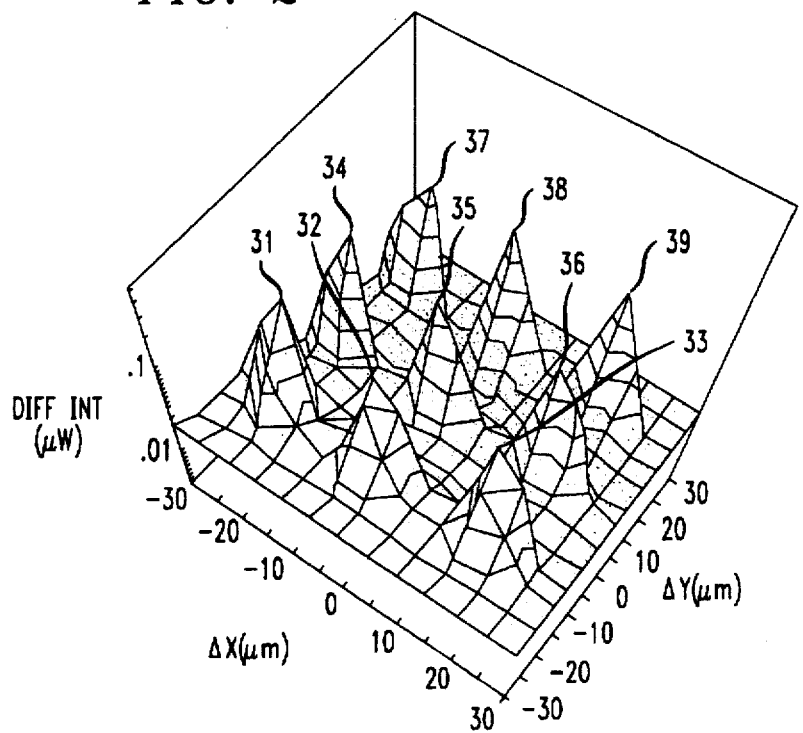
FIG. 2 is a plot of diffracted intensity and position for an illustrative 3×3 portion of a holographic array.

FIG. 2 shows a 3×3 portion 30 of an array of holograms representative of those produced in the examples. Diffracted intensity is plotted for three rows portions, each containing three holograms. In-plane dimensions are in units of µm, both for row direction (ΔX) and for row-to-row or column direction (ΔY). Holograms 31–33, 34–36 and 37–39, all of peak diffracted intensity of about 0.1 µW, constitute row portions. Hologram spacing is about the same within rows and row-to-row, with 3-hologram groups contained within a distance of 60 µm. Partial overlap is seen in both directions as increasing value of diffracted intensity between peaks, increasing from minimum, but non-zero value, to greater value as peaks are approached. Row portions depicted are substantially straight and parallel, constituting a portion of a rectalinear array contained in a substantially planar medium.

Replication—Many contemplated uses require making copies of the holographic array "master". *Handbook of Optical Holography*, Academic Press 1979, at pp. 373–377, describes replication of non-multiplexed holograms. One method, "copying by reconstruction", first reconstructs the image and thereafter records a new hologram, using the reconstructed image. The method is applicable to thick as well as thin holograms. It has been used for multiplexed holograms by reconstructing and copying individual holograms one at a time.

Copying by reconstruction is usefully employed in the present work. The multiplexing step, independent of the individual hologram replication step, now follows the new procedure—medium and/or beams are stepped between sequential recordings. Alternatively, multiple holograms can be simultaneously reconstructed and copied by use of multiple, mutually-incoherent reference beams of differing angles of incidence, resulting in simultaneous replication of a series of overlapping holograms. This procedure is analogous to one using Bragg selection as described in *Optics Letters*, vol. 17, no. 9, pp. 676–678 (1992).

Phase-correlation multiplexing offers a unique opportunity for replication. Since image selection does not depend on Bragg selectivity, there is no requirement for a thick medium. In thin media, the 2D array may be replicated in its entirety in a single step or series of steps without repeating the multiplexing procedure. Stamping, embossing, and casting, used for non-multiplexer 2D relief-phase holograms, becomes feasible. The array may be recorded as a topological master or may be converted to enable replication.

Where the holographic array is 2D, it may be replicated by any of the procedures used for copying photographs, but with an additional bleaching step. *Holography Handbook*, Ross Books, Berkeley, Calif., pp. 56,57, 1993. Bleaching converts an amplitude hologram into a phase hologram— e.g., the developed film image, constituted of elemental silver particles in a matrix, is rendered colorless leaving index variations as the only record of its presence. It is convenient to replicate from an unconverted—unbleached— master.

There is a further possibility offered in replication of 2D arrays. Since all relevant information—now including that necessary for selection as well as for reconstruction—is independent of thickness, replication does not critically depend on wavelength. The entire array or a portion may be reproduced using a wavelength which matches the actinic properties of the copy medium. Ordinarily, this leads to use of a wavelength shorter than that used during mastering and reconstruction.

Applications

The advance offers significant service opportunities. The holographic array, in the possession of a user, may be selectively accessed upon payment. An analogous prior art practice uses CD ROMs in which access to specified segments, each containing prescribed software or dam, is granted by access codes which are given to the user at his request. See, *CD-ROM Librarian*, vol 7, no. 4, pp. 16–21, April 1992. Under certain circumstances, access to the entire array may be granted as part of an initial sale, by use fee, or by subscription. The inventive array may be at a centrally located site, and used for conveying information to remote users, in the manner of contemplated movie-on-demand.

In most uses, hologram/multiplex recording serves only for initial supply. Thereafter, they are used in "read only" applications. Other uses are served by "write once" —as in creation of a lasting database. Avoidance of thick media overcomes an obstacle to "read-write" usage.

Variations

Discussion has largely been for moved medium and fixed beams. For many contemplated uses, moving beams may be preferred for rapid access. Beam steering may be used for row-by-row recording. It facilitates more complex path patterns.

The methods are applicable to non-planar media—to cylinders and other geometric forms. They are useful with flexible media in mastering and/or replication, and, particularly with thin media, may be coiled for storage, perhaps as tape.

The disclosure has been in terms of a rectilinear array of x-direction rows of overlapping holograms, with rows overlapping in the y-direction. (illustrated in FIG. 2 as rows 31–33, 34–36 and 37–39). In detailed description, continuous edge-to-edge rows have been followed by stepwise motion to initiate each subsequent row. Other schedules are equivalent. Somewhat greater packing density may result from offsetting sequential rows so that holograms are staggered in the y-direction.

Relative motion of the medium may be circular, with successive rows (illustrated in FIG. 3 as 42–45 and 46–47) along successive circular paths of increasing radius from a common point of origin. Description remains unchanged— "x-direction", "shift-direction", etc., in this event, describe instantaneous directions.

Much of the experimental work was based on transmission holography using a Fourier transform for the signal. The multiplexing method of the invention is not specific to this particular form, so that recording may be based on reflection holography, may image the signal on the medium, or may record the hologram on a plane intermediate the Fourier and image planes of the signal. The various other adjuncts used in holography are not precluded—these include use of diffusers in contact with the transparency or at an image plane to improve recording fidelity. Other spatial filtering to filter out all but a desired signal mode may also be included. These and other forms of holograms are suitably multiplexed.

The requirement that the phase mask based in reconstruction be identical to that used in recording, is an inherent safeguard, assuring user authenticity, and permitting encryption. The same purpose may be served by translation—e.g. rotation or shifting—of the mask relative to hologram position. In this manner, improper possession would be inadequate for accessing.

Relative Motion—In prior art shift holography, successive partially-overlapping holograms are recorded. Generally, major portions of succeeding holograms occupy the same volume, with the portions occupying fresh volume defined by "shift". The identical concept plays a role at least in a preferred embodiment of the present invention. In order for this to occur in recording, it is necessary that position of incidence of the beams in the vicinity of the interference region be moved relative to the medium—during reconstruction, the analogous relative motion entails the single readout beam, so that the position of incidence is now determined by the position of the hologram to be accessed.

Relative motion may be produced by movement of the medium, or by movement of the beams. Alternative to movement of the entire beam (by movement of source and all optical elements), the latter may take the form of a variety of forms of "beam steering", in which only a part of the optical train associated with the relevant beam is changed—by physical motion, by introduction of an additional element, etc. The terminology "moving the medium and the beams relative to each other" in appended claims is intended to include all such variations.

What is claimed is:

1. Holographic process in which an array of individual partially overlapping holograms is recorded in a recording medium, the process comprising recording each individual hologram at an individual location by interfering a reference beam and a signal beam, and by moving the medium and the beams relative to each other to locate each individual hologram,

CHARACTERIZED IN THAT the reference beam used for recording the individual holograms of the array, as measured at the position of interference, is a phase beam of unchanging content containing a multiplicity of rays of non-uniform angle of incidence and of non-uniform phase, the reference beam having a position-to-position self-similarity such that its auto-correlation function has a value which is sufficiently small to enable selection of individual holograms of the array.

2. Process of claim 1 in which the array comprises overlapping rows of overlapping holograms.

3. Process of claim 2 in which an individual row is recorded prior to a sequential row.

4. Process of claim 2 in which rows are substantially straight and parallel.

5. Process of claim 2 in which rows are substantially circular.

6. Process of claim 1 in which the recording medium is substantially planar.

7. Process of claim 6 in which the thickness of the recording medium is less than 1 mm.

8. Process of claim 1 in which the content of the reference beam is deterministic.

9. Process of claim 1 in which the reference beam is produced by illumination of a phase mask.

10. Process of claim 9 in which the phase mask is a binary phase mask.

11. Process of claim 9 in which the pattern of the ray angles of the reference beam does not repeat over the field of the hologram.

12. Process of claim 1 in which relative motion between the medium and the beams is produced by moving the medium relative to stationary beams.

13. Process of claim 1 in which shifting is accomplished by moving the beams relative to the recording medium.

14. Process of claim 1 in which the process includes a readout step in which holograms are reconstructed.

15. Holographic process comprising reconstruction of individual holograms contained in an array of partially overlapping individual holograms recorded in a medium, the process comprising illumination with a readout beam which is successively positioned by movement of the beam and the medium relative to each other in order to locate each individual hologram

CHARACTERIZED IN THAT the readout beam used for reconstructing the individual holograms of the array, as measured at the medium, is a phase beam of unchanging content containing a multiplicity of rays of non-uniform angle of incidence and of non-uniform phase, the readout beam having a position-to position self-similarity such that its auto correlation function has a value which is sufficiently small to enable selection of individual holograms of the array.

16. Process of claim 15 in which the readout beam is produced by illumination of a phase mask.

17. Process of claim 15 comprising reconstruction of multiple holograms within the array, in which the beam is repositioned by relative movement for each hologram which is reconstructed.

18. Process of claim 17 in which the array is rectilinear and comprises x-direction rows arrayed in the y-direction, with holograms overlapping in both directions.

19. Process of claim 17 in which the array is circular and comprises multiple concentric circular rows with holograms overlapping in both directions.

20. Process of claim 15 in which the medium is in the possession of a user and access information is in the possession of a service provider.

21. Process of claim 15 in which phase mask information required for access is restricted to qualified users.

22. Process of claim 21 in which required phase mask information comprises positioning of a phase mask.

23. Process of claim 15 including recording of at least a part of the array, in which recording includes interfering a reference beam and a signal beam in the recording medium.

24. Process of claim 15 in which relative motion between the medium and the beams is produced by moving the medium relative to stationary beams.

25. Process of claim 15 in which shifting is accomplished by moving the beams relative to the recording medium.

26. Process for replication of a holographic array of partially overlapping holograms

CHARACTERIZED IN THAT the array is produced by the holographic process of claim 1 and in that the array is replicated by a procedure selected from the group consisting of stamping, embossing, casting, and procedures used for copying photographs but with an additional bleaching step.

27. Process for replication of a holographic array of partially overlapping holograms

CHARACTERIZED IN THAT the array is recorded by the holographic process of claim 1 and in that it is replicated by reconstruction.

28. Process of claim 15 in which the reference beam is spatially filtered.

29. Process of claim 1 in which the reference beam is spatially filtered.

30. Article including a holographic array of partially overlapping holograms comprising a medium containing signal information and selection information for uniquely reconstructing an individual hologram in a succession of displaced holograms

CHARACTERIZED IN THAT the selection information takes the form of the pattern of a phase beam which has a position-to-position self-similarity such that its auto-correlation function has a value which is sufficiently small to enable selection of the individual hologram.

31. Article of claim 30 in which the phase beam is of a pattern which corresponds with a phase mask.

32. Article of claim 30 in which the medium is substantially planar.

33. Article of claim 32 in Which the medium is of thickness less than 1 mm.

* * * * *